United States Patent
Jeong et al.

(10) Patent No.: US 12,190,761 B2
(45) Date of Patent: Jan. 7, 2025

(54) DISPLAY DEVICE AND METHOD FOR INSPECTING IMAGE DATA THEREOF

(71) Applicant: LX SEMICON CO., LTD., Daejeon (KR)

(72) Inventors: Seok Jin Jeong, Daejeon (KR); Bong Sin Kwak, Daejeon (KR); Man Jung Kim, Daejeon (KR); Myung Yu Kim, Daejeon (KR); Kwang Hee Yoon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/471,747

(22) Filed: Sep. 21, 2023

(65) Prior Publication Data

US 2024/0105087 A1 Mar. 28, 2024

(30) Foreign Application Priority Data

Sep. 22, 2022 (KR) .................. 10-2022-0120024
Mar. 28, 2023 (KR) .................. 10-2023-0040328

(51) Int. Cl.
    *G09G 3/00* (2006.01)
    *G06F 11/10* (2006.01)

(52) U.S. Cl.
    CPC .......... *G09G 3/006* (2013.01); *G06F 11/1004* (2013.01); *G09G 2380/10* (2013.01)

(58) Field of Classification Search
    CPC ............... G09G 3/006; G09G 2380/10; G09G 2310/04; G09G 2330/12; G06F 11/1004
See application file for complete search history.

(56) References Cited

U.S. PATENT DOCUMENTS

| | | | |
|---|---|---|---|
| 2016/0063668 A1* | 3/2016 | Kim | G06T 1/60 345/536 |
| 2016/0372033 A1* | 12/2016 | Yoo | G09G 3/3233 |
| 2020/0050520 A1 | 2/2020 | Ogawa | |

FOREIGN PATENT DOCUMENTS

| KR | 101631394 B1 * | 6/2016 | |
|---|---|---|---|
| WO | WO-2020045943 A1 * | 3/2020 | H04L 1/0042 |

OTHER PUBLICATIONS

European Search Report issued for European Patent Application No. 23198100.2 dated Nov. 30, 2023, 13 pages.

* cited by examiner

*Primary Examiner* — Ricardo Osorio
(74) *Attorney, Agent, or Firm* — ROTHWELL, FIGG, ERNST & MANBECK, P.C.

(57) ABSTRACT

The present disclosure provides a display device for inspecting image data that may include a data processing device configured to generate first cyclic redundancy check (CRC) data for a partial area among areas of image data included in a first frame to transmit the image data of the first frame and the first CRC data and a data driving device configured to receive the image data of the first frame and the first CRC data from the data processing device to generate second CRC data for a partial area among areas of the image data included in the first frame on the basis of the image data of the first frame and to compare the first CRC data with the second CRC data to determine whether there is an error in the partial area among areas of the image data included in the first frame.

15 Claims, 12 Drawing Sheets

DISPLAY DEVICE AND METHOD FOR INSPECTING IMAGE DATA THEREOF

CROSS-REFERENCE TO RELATED APPLICATIONS

This application claims priority to and the benefit of Korean Patent Application No. 10-2022-0120024, filed on Sep. 22, 2022, and Korean Patent Application No. 10-2023-0040328, filed on Mar. 28, 2023, the disclosures of which are incorporated herein by reference in their entirety.

TECHNICAL FIELD

The present disclosure relates to a display device and a method for inspecting image data thereof.

BACKGROUND

A display panel may include multiple pixels arranged in a matrix form and each pixel may constitute sub-pixels such as red (R), green (G), and blue (B). Each sub-pixel may display an image on the display panel while emitting light with a grayscale corresponding to video data (or image data).

Image data may be transmitted from a host (e.g., a graphics processor unit (GPU)) to a timing controller. In addition, the image data may be transmitted from the timing controller to a source driver. In this case, a device for transmitting the image data may be referred to as a display processing device for convenience, and a device for receiving the image data may be referred to as a display driving device for convenience. For example, the image data may be transmitted in a form of digital values and the source driver may convert the transmitted image data in the form of digital values into analog voltages to drive each sub-pixel.

Meanwhile, as display devices are getting larger in size and higher in resolution, a demand for a high-performance interface for transmitting signals between a video source (e.g., a host) and a display device is arising. To meet this demand, Vx1 is applying for a television (TV), and a display port (hereinafter referred to as "DP") is applying for IT products such as a laptop computer. A DP interface, as an interface regulated by Video Electronics Standards Association (VESA), is an interface scheme that may integrate low voltage differential signaling (LVDS) of existing internal interface standard and a digital visual interface (DVI) of external connection standard into one. The DP interface is a technology that may digitally make not only an internal connection between chips but also an external connection between products. As the two divided interfaces are integrated into one, it is possible to support higher color depth and resolution by widening a data bandwidth. For example, the DP interface may have a bandwidth of up to 10.8 Gbps which is twice or more that of the existing DVI (maximum 4.95 Gbps) and simultaneously transmit up to six streams of 1080i (three streams of 1080p) through one connector connection by supporting multi-streams using Micro-Packet architecture. VESA has announced a new version of the embedded Display Port (hereinafter referred to as "eDP") standard. The eDP standard is an interface standard corresponding to the DP interface designed for embedded display applications such as laptop computers, tablets, netbooks, and all-in-one desktop PCs.

Meanwhile, a vehicle display applied to a vehicle may display a map, a gear state, a turn signal lamp state, a vehicle state, and the like. In addition, the vehicle display may also display values acquired by various sensors in the vehicle. For example, the vehicle display may display front/rear/side vehicle position, pedestrian position, obstacle position, and the like. As described above, some of the information displayed on the vehicle display may include information that has a fatal impact on vehicle safety. Therefore, a vehicle accident may occur when a driver recognizes a condition of a vehicle or its surroundings according to incorrect information displayed on the vehicle display.

Therefore, there is a need for a method capable of inspecting errors of information displayed on the vehicle display.

SUMMARY

Technical Problem

With this background, an aspect of the present disclosure is to provide a display device capable of inspecting an error in data in an important area of information displayed on a display (e.g., a vehicle display) and a method for inspecting image data thereof. In addition, an aspect of the present disclosure is to provide a display device capable of inspecting an error in data in an important area without adding a separate interface for transmitting CRC data and a method for inspecting image data thereof.

Technical Solution

To this end, an embodiment of the present disclosure provides a method for inspecting image data of a display device including a data processing device and a data driving device, which may include generating, by the data processing device, first cyclic redundancy check (CRC) data for a partial area among areas of image data included in a first frame and transmitting the image data of the first frame and the first CRC data to the data driving device, receiving, by the data driving device, the image data of the first frame and the first CRC data and generating second CRC data for a partial area among areas of the image data included in the first frame on the basis of the image data of the first frame, and comparing, by the data driving device, the first CRC data with the second CRC data to determine whether there is an error in the partial area among areas of the image data included in the first frame.

Another embodiment of the present disclosure provides a display device for inspecting image data that may include a data processing device configured to generate first cyclic redundancy check (CRC) data for a partial area among areas of image data included in a first frame to transmit the image data of the first frame and the first CRC data and a data driving device configured to receive the image data of the first frame and the first CRC data from the data processing device to generate second CRC data for a partial area among areas of the image data included in the first frame on the basis of the image data of the first frame and to compare the first CRC data with the second CRC data to determine whether there is an error in the partial area among areas of the image data included in the first frame.

Still another embodiment of the present disclosure provides the data processing device that may include a first CRC generator configured to generate the first CRC data for the partial area among areas of the image data included in the first frame and a frame data generator configured to generate data of the first frame so that the first CRC data is transmitted at the time of transmission of the image data.

Yet another embodiment of the present disclosure provides the data driving device that may include a frame data receiving part configured to receive data of the first frame transmitted from the data processing device, a second CRC generator configured to generate the second cyclic redundancy check (CRC) data for the partial area among areas of the image data included in the first frame, a CRC extractor configured to confirm the first CRC data received at the time of receiving image data from the data of the first frame, and a CRC checker configured to compare the first CRC data corresponding to the partial area among the first CRC data confirmed by the CRC extractor with the second CRC data generated by the second CRC generator to determine whether there is an error in the partial area.

Advantageous Effects

As described above, according to an embodiment of the present disclosure, it is possible to inspect an error in data in an important area of information displayed on a display (e.g., a vehicle display).

In addition, according to an embodiment of the present disclosure, it is possible to inspect an error in data in an important area of information displayed on a display (e.g., a vehicle display) without adding a separate interface for transmitting CRC data.

DETAILED DESCRIPTION OF THE EMBODIMENTS

Figure 1:
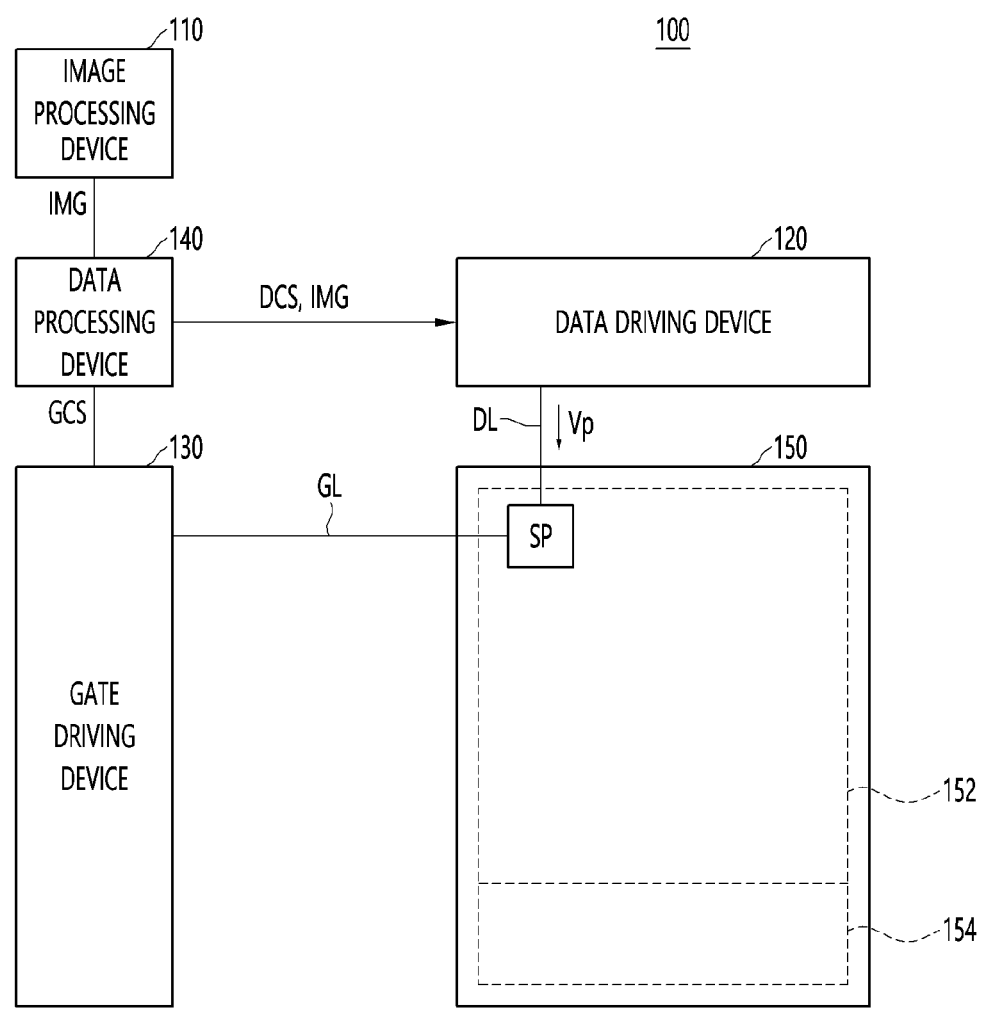
FIG. 1 is a block diagram of a display device according to an embodiment.

Hereinafter, embodiments of the present disclosure will be described in detail with reference to the accompanying drawings. In adding reference numerals to elements in each drawing, the same elements will be designated by the same reference numerals as far as possible, although they are shown in different drawings. In addition, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing elements of the present disclosure. These terms are merely used to distinguish one element from other elements, and a property, an order, a sequence or the like of a corresponding element are not limited by the terms. When it is described in the specification that an element is "connected," "coupled" or "joined" to another element, it should be understood that the element may be directly connected, coupled or joined to the other elements, but another element may be "connected," "coupled," and "joined" between the element and other elements.

FIG. 1 is a block diagram of a display device according to an embodiment.

Referring to FIG. 1, a display device 100 may include a plurality of panel driving devices (or panel driving circuits) 110, 120, 130, and 140 and a display panel 150.

Multiple data lines DL, multiple gate lines GL, and multiple pixels may be disposed on the display panel 150. A pixel P may consist of a plurality of sub-pixels SP. Here, the sub-pixels may be R (red), G (green), B (blue), and W (white). A pixel may consist of RGB sub-pixels SP, RGBG sub-pixels SP, or RGBW sub-pixels SP. For convenience of description, the present disclosure will be described hereinafter on supposition that a pixel consists of RGB sub-pixels SP.

The panel driving devices (or panel driving circuits) 110, 120, 130, and 140 are devices configured to generate signals for displaying images on the display panel 150. which may include at least one of an image processing device (or image processing circuit) 110, a data driving device (or data driving circuit) 120, a gate driving device (or gate driving circuit) 130, and a data processing device (or data processing circuit) 140.

The gate driving device (or gate driving circuit) 130 may supply gate driving signals of turn-on voltage or turn-off voltage to gate lines GL. When a gate driving signal of turn-on voltage is supplied to a sub-pixel SP, the sub-pixel SP may be connected to a data line DL. When a gate driving signal of turn-off voltage is supplied to the sub-pixel SP, the sub-pixel SP may be disconnected from the data line DL. The gate driving device 130 may be referred to as a gate driver.

The data driving device (or data driving circuit) 120 may supply data voltage Vp to a sub-pixel SP through a data line DL. The data voltage Vp supplied through the data line DL may be supplied to the sub-pixel SP according to the gate driving signal. The data driving device 120 may be referred to as a source driver.

The data driving device 120 may include at least one integrated circuit and this at least one integrated circuit may be connected to a bonding pad of the display panel 150 in a tape automated bonding (TAB) type or a chip-on-glass (COG) type, directly formed on the display panel 150, or integrated on the display panel 150 according to embodiments. In addition, the data driving device 120 may be formed in a chip-on-film (COF) type.

When the data driving device 120 is formed in the chip-on-glass type, integrated circuits constituting the data driving device 120 may be formed on a periphery 154 of an active area 152 where sub-pixels SP are disposed. To maximize the active area 152 of the display panel 150, an area of the periphery 154 may be narrowed and chip sizes of the integrated circuits constituting the data driving device 120 may be reduced.

The data processing device (or data processing circuit) 140 may supply control signals to the gate driving device 130 and the data driving device 120. For example, the data processing device 140 may transmit gate control signals GCS which makes a scan started to the gate driving device 130. In addition, the data processing device 140 may output image data IMG to the data driving device 120. Further, the data processing device 140 may transmit data control signals DCS for controlling the data driving device 120 to supply data voltage Vp to each sub-pixel. The data processing device 140 may be referred to as a timing controller.

The image processing device 110 may generate image data IMG and transmit the same to the data processing device 140. The image processing device 110 may be referred to as a host. For example, the image processing device 110 may include a graphic processing unit (GPU).

The data processing device 140 may include at least one data processing circuit implemented in a form of an integrated circuit and the data driving device 120 may include at least one data driving circuit implemented in a form of an integrated circuit. A high-speed communication interface is formed between the data processing circuit and the data driving circuit and the data processing circuit may transmit data control signals DCS and/or image data IMG to the data driving circuit through such a high-speed communication interface.

Figure 2:
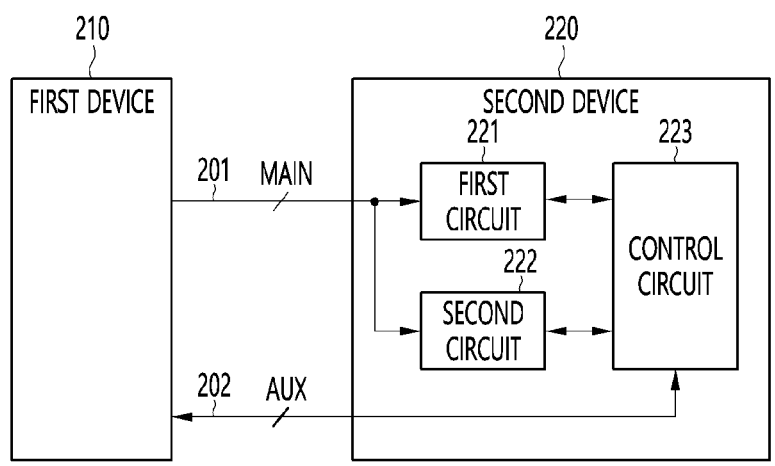
FIG. 2 is a block diagram of a data communication system according to an embodiment.

FIG. 2 is a block diagram of a data communication system according to an embodiment.

Referring to FIG. 2, the data communication system may include a first device 210 and a second device 220. The first device 210 may transmit data (e.g., image data) to the second device 220 through a main line MAIN 201. The first device 210 may be referred to as a data transmitting device, and the second device 220 may be referred to as a data receiving device. The second device 220 may include a first circuit 221, a second circuit 222, and a control circuit 223.

Referring to FIG. 1 described above, according to an embodiment, since image data is transmitted from the image processing device 110 to the data processing device 140, when the image processing device 110 corresponds to the first device 210, the data processing device 140 may correspond to the second device 220. In addition, since image data is transmitted from the data processing device 140 to the data driving device 120, when the data processing device 140 corresponds to the first device 210, the data driving device 120 may correspond to the second device 220.

According to an embodiment, the first device 210 and the second device 220 may be connected to a plurality of main lines MAIN 201 and at least one auxiliary line AUX 202. In addition, although not shown in FIG. 2, the first device 210 and the second device 220 may be connected to at least one clock line CL. According to an embodiment, when data including a clock signal is transmitted through the main line MAIN 201, the clock line CL may be omitted. For example, when the main line MAIN 201 consists of a differential signal and data including a clock signal is transmitted through the main line MAIN 201, a signal including the clock signal may be referred to as a clock embedded differential signal (CEDS), but embodiments to be described later are not limited to the term.

According to an embodiment, an auxiliary signal (or control signal) may be transmitted through the auxiliary line AUX 202. When the auxiliary signal (or control signal) is transmitted through the main line MAIN 201 without a separate auxiliary line AUX, it may be referred to as AUX-less communication, but embodiments to be described later are not limited to the term. According to an embodiment, the auxiliary signal (or control signal) may be, for example, a signal indicating a state of the second device 220 (or the first circuit 221). When the auxiliary signal has a first level of voltage, it may indicate that the second device 220 is in a state in which it is possible to receive data. When the auxiliary signal has a second level of voltage, it may indicate that the second device 220 is in a state in which it is difficult to receive data. Here, the first level and the second level may be different voltage levels. The auxiliary signal may be referred to as a lock signal. In the phase locked loop (PLL) method, a data receiving side may include a step of adjusting a clock phase in accordance with a communication signal and when the clock phase is adjusted, a lock signal may be changed. For example, the lock signal may be changed from a low level to a high level or from a high level to a low level.

According to an embodiment, a lock signal may be transmitted through the auxiliary line AUX 202. Here, the lock signal may indicate a state of adjustment of clock phase as well as other states of the second device 220. For example, the level change of the lock signal from high to low may indicate that the second device 220 is in a state in which the data reception is difficult or that a communication signal transmitted to the second device 220 is abnormal.

According to an embodiment, a clock pattern may be transmitted through the clock line CL or the main line MAIN 201. The clock pattern, for example, may indicate a byte unit of data transmitted through the main line MAIN (e.g., ML1, ML, . . . , MLn). The second device 220 may recognize received data by the byte unit according to the clock pattern. For example, the second device 220 may receive the clock pattern through the main line MAIN 201 and train a communication clock according to the clock pattern. In addition, the second device 220 may receive data transmitted through the main line MAIN 201 according to the communication clock.

According to an embodiment, as described above, the clock line CL may not be used. In this case, a clock pattern may be embedded in data transmitted through the main line MAIN 201. Such a clock pattern may be referred to as an embedded clock. According to an embodiment, a communication signal of low voltage and high frequency may be transmitted through the main line MAIN 201 (or main transmission line). The main line MAIN 201 may have two lines in pair (e.g., a positive line and a negative line), and the two lines in pair may transmit a communication signal in a differential signal transmission method.

According to an embodiment, data (e.g., image data) may be transmitted through the main line MAIN 201. In addition, the data may include information or patterns. For example, configuration data, image data, and the like transmitted through the main line MAIN 201 may include information. The configuration data may include information on all set values necessary for the operation of the second device 220 and the image data may include information on a grayscale value of each pixel. The configuration data may include the data control signal (see DCS of FIG. 1) described with reference to FIG. 1 and the image data may be the image data (see IMG of FIG. 1) described with reference to FIG. 1.

According to an embodiment, training data (or link data) transmitted through the main line MAIN 201 may include a set pattern. Here, the pattern may indicate a temporal rule of the signal. The first device 210 and the second device 220 may exchange data in a non-synchronized state due to a delay or others on the main line MAIN. To transmit/receive data in such a non-synchronized state, the second device 220 may train a data link using training data and receive configuration data or image data according to the trained data link. The training data (or link data) is mainly transmitted and received for training of the data link, however, in an embodiment, the training data may be transmitted and received so as to indicate a piece of information.

According to an embodiment, the first circuit 221 of the second device 220 may receive and process data transmitted through the main line MAIN 201 (e.g., a differential signal line) from the first device 210. The second circuit 222 of the second device 220 may receive and process a control signal transmitted through the main line MAIN 201 (e.g., a differential signal line) from the first device 210. The control signal processed by the second circuit 222 of the second device 220 may include a signal for controlling the first circuit 221. For example, the control signal processed by the second circuit 222 of the second device 220 may include a signal for controlling power supplied to the first circuit 221 (e.g., a signal for cutting off or reducing power).

According to an embodiment, the control circuit 223 may control power supplied to the first circuit 221 (e.g., cut off or reduce power) on the basis of the control signal processed through the second circuit 222. According to an embodiment, when data (e.g., image data) transmitted from the first device 210 is received by the second device 220, there may be a temporary stream inactive period in which data is not transmitted. The control circuit 223 may cut off or reduce power supplied to the first circuit 221 to reduce power consumption during the period in which the data is not transmitted. For example, power supplied to the first circuit 221 may be cut off or reduced to reduce power consumption during the period in which the data is not transmitted. For example, a mode for cutting off or reducing power supplied to the first circuit 221 may be referred to as a low power mode, but various embodiments are not limited to the term. The first device 210 may transmit a control signal through the main line MAIN 201 to control a mode of the first circuit 221 included in the second device 220. The control signal transmitted through the main line MAIN 201 may be processed by the second circuit 222 of the second device 220. A signal for switching a mode again to receive data of the first circuit 221 in a state in which the first circuit 221 has limited power supply may be referred to as a wake-up signal, but various embodiments are not limited to the term. A signal for switching to a low power mode upon entering the temporary stream inactive period in a state in which power is normally supplied to the first circuit 221 may be referred to as a sleep signal, but various embodiments are not limited to the term. In addition, a function of managing power by controlling a mode of the second device 220 receiving data as described above may be referred to as advanced link power management (ALPM), but various embodiments are not limited to the term.

According to an embodiment, the first device 210 and the second device 220 may communicate with each other through a DP interface, an eDP interface, or a high-definition multimedia interface (HDMI). Hereinafter, with reference to FIG. 3, an embodiment in which communication is performed between the first device 210 and the second device 220 through the eDP interface will be described, but the following embodiments are not limited thereto.

Figure 3:
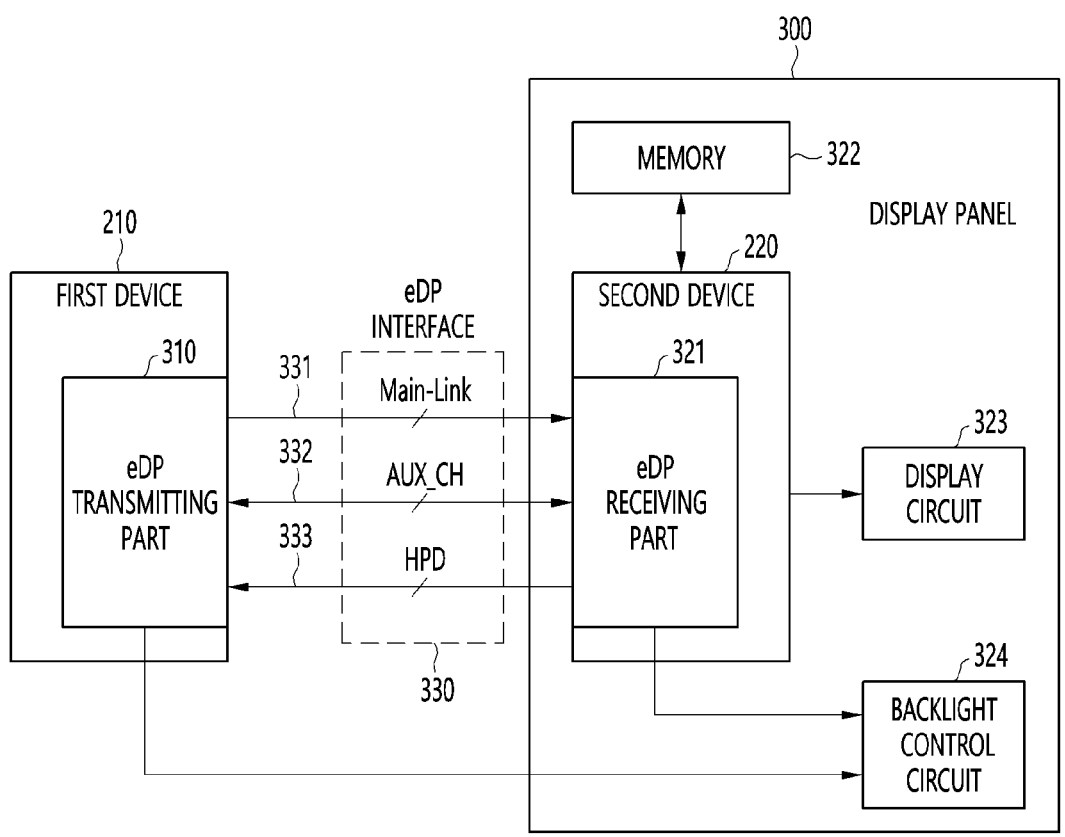
FIG. 3 is a block diagram of a data communication system according to an embodiment.

FIG. 3 is a block diagram of a data communication system according to an embodiment.

Referring to FIG. 3, the data communication system according to an embodiment may include a first device 210 and a second device 220. The first device 210 may include an eDP transmitting part 310 to communicate with the second device 220 through an eDP interface 330. The second device 220 may include an eDP receiving part 321 to communicate with the first device 210 through the eDP interface 330. In this case, the first device 210 may be referred to as a source device and the second device 220 may be referred to as a sink device. In addition, the eDP transmitting part 310 may be referred to as a source device functional part and the eDP receiving part 321 may be referred to as a sink device functional part. According to an embodiment, the second device 220 may be included in a display panel 300. For example, the display panel 300 may include a second device 220, a memory 322, a display circuit 323, and a backlight control circuit 324. The eDP transmitting part 310 included in the first device 210 may be integrated into the GPU as described above. The eDP receiving part 321 included in the second device 220 may be integrated into the data processing device 140 (e.g., timing controller).

Figure 5:
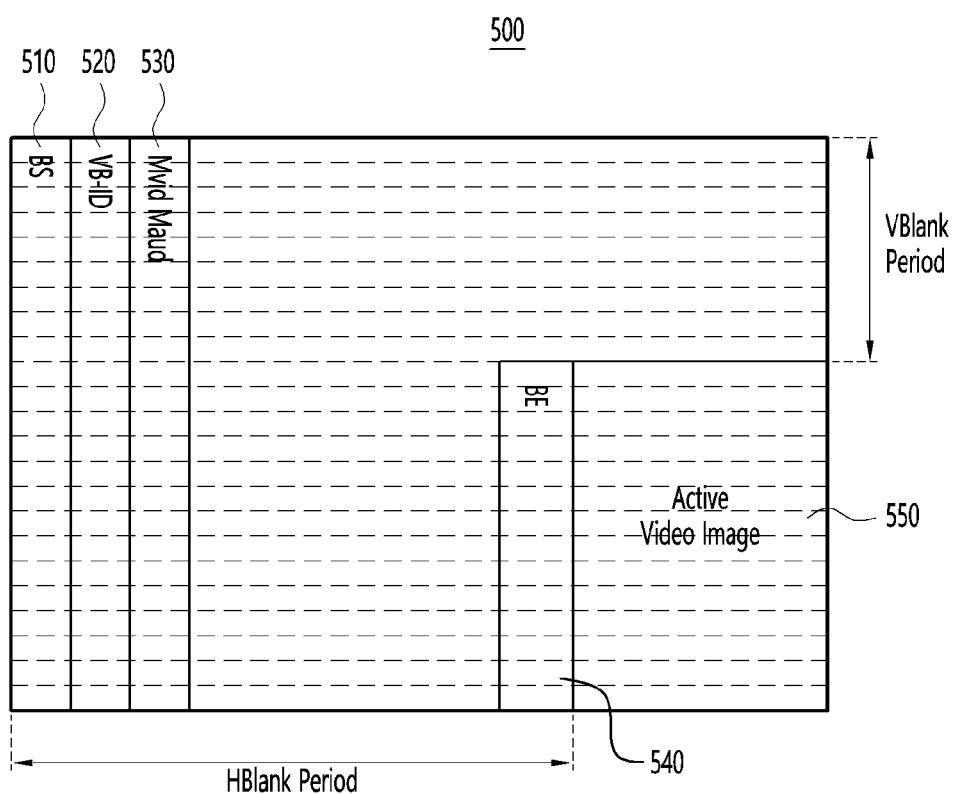
FIG. 5 is a diagram illustrating a structure of frame data according to an embodiment.

According to an embodiment, the eDP interface 330 may include a main link (Main-Link) 331, an auxiliary line (AUX_CH) 332, and a hot plug detect (HPD) line 333. The HPD line 333 may be a signal line for detecting an eDP interface connection between the first device 210 and the second device 220. For example, when the first device 210 and the second device 220 are connected through the HPD line 333, the first device 210 may detect a connection to the second device 220 through the eDP interface 330 and prepare communication with the second device 220 through an eDP protocol. The auxiliary line 332 may transmit and receive all set information for eDP communication between the first device 210 and the second device 220. In addition, the first device 210 may determine whether the second device 220 is in a communicable state on the basis of a signal detected through the auxiliary line 332. In addition, the eDP transmitting part 310 of the first device 210 may transmit mode switching information through the auxiliary line 332 so that the main link 331 operates in a low power mode. According to an embodiment, the first device 210 may transmit image data through the main link 331 and transmit data defined in a form of a frame as shown in FIG. 5 described later.

According to an embodiment, a display ID or an extended display ID (EDID) for setting a specific panel may be stored in the memory 322 included in the display panel 300. The first device 210 may use the auxiliary line 332 of the eDP interface 330 to check the display ID or EDID stored in the memory 322. The eDP transmitting part 310 or the eDP receiving part 321 may transmit a backlight control signal to the backlight control circuit 324. The backlight control circuit 324 may control dimming of the backlight on the basis of the backlight control signal received through the eDP transmitting part 310 or the eDP receiving part 321.

According to an embodiment, the second device 220 may receive image data for display from the first device 210 through the main link 331 of the eDP interface 330. The image data received from the second device 220 may be transmitted to the display circuit 323. The display circuit 323 may convert digital image data received from the second device 220 into an analog signal and then supply the analog signal to each pixel (or sub-pixel (SP)).

Figure 4:
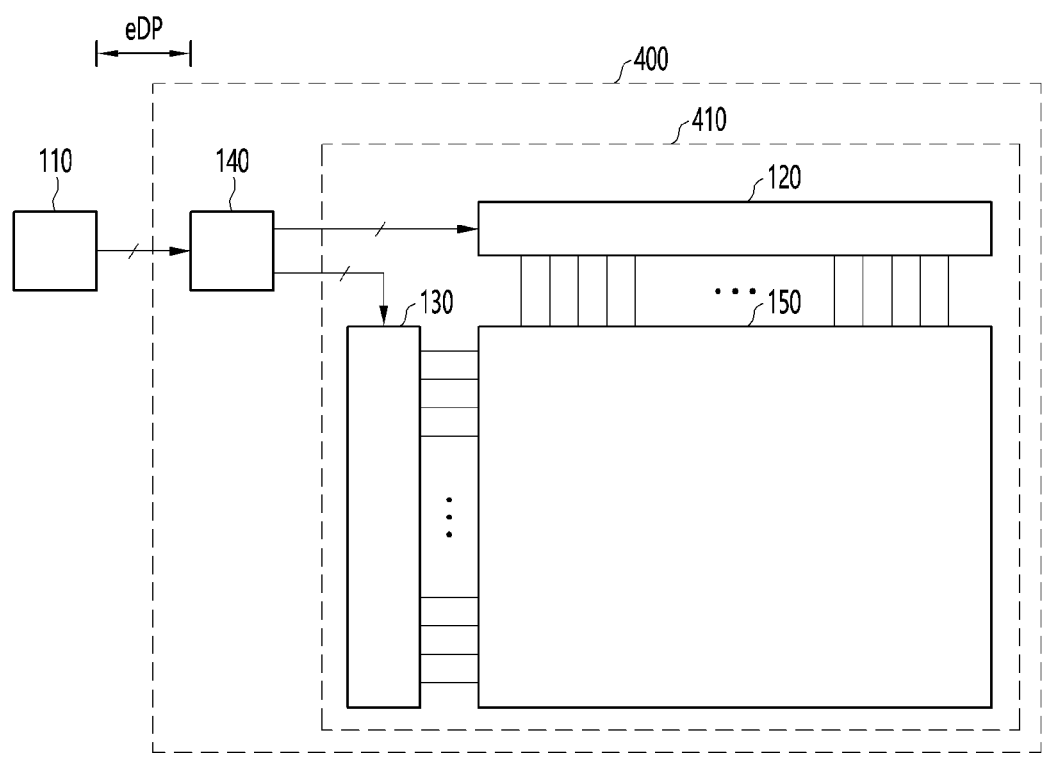
FIG. 4 is a block diagram of a display device according to an embodiment.

FIG. 4 is a block diagram of a display device according to an embodiment.

Referring to FIG. 4, the display device according to an embodiment may include a source unit (e.g., the image processing device 110) and a sink unit 400. The source unit (e.g., the image processing device 110) indicates a system and may include an eDP transmitting part (e.g., the eDP transmitting part 310 of FIG. 3). The sink unit 400 indicates a panel unit and may include a data processing device 140 (e.g., a timing controller) and a display unit 410. As described above, the data processing device 140 may include an eDP receiving part (e.g., the eDP receiving part 321 of FIG. 3). Such a source unit (e.g., the image processing device 110) and the sink unit 400 may mutually communicate through an eDP interface (e.g., the eDP interface 330 of FIG. 3).

The source unit (e.g., the image processing device 110) may transmit image data to the data processing device 140 included in the sink unit 400 through the eDP transmitting part. The data processing device 140 may receive image data through the eDP receiving part and apply the image data to the display unit 410. In addition, the data processing device 140 may generate timing control signals for controlling an operation timing of driving circuits (e.g., a data driving device 120 and a gate driving device 130 included in the display unit 410). An interface for data transmission between the data processing device 140 and the data driving device 120 may be implemented as a mini LVDS interface, but the embodiment is not limited thereto. According to an embodiment, the display unit 410 may include the display panel 150, the data driving device 120, and the gate driving device 130. Since detailed configurations of the display unit 410 have been described in FIG. 1, detailed descriptions thereof will be omitted.

FIG. 5 is a diagram illustrating a structure of frame data according to an embodiment.

Referring to FIG. 5, one frame 500 may include a vertical blank period (VBlank Period), a horizontal blank period (HBlank Period), and image data 550 (e.g., active video image data). Horizontal lines without the image data 550 may constitute a vertical blank period and the vertical blank period may be transmitted in the order of blank start data (BS) 510, a vertical blank ID (VB-ID) 520, a video M value, and an audio M value (Mvid/Maud) 530. Horizontal lines with the image data 550 may transmit the image data 550 after the horizontal blank period. The horizontal blank period may be transmitted in the order of the BS 510, the VB-ID 520, the Mvid/Maud 530, and blank end (BE) data 540. Referring to FIG. 3 together, according to an embodiment, the eDP transmitting part 310 of the first device 210 may sequentially transmit data corresponding to each horizontal line of the frame 500. to the eDP receiving part 321 of the second device 220 through the main link 331 of the eDP interface 330.

Figure 6:
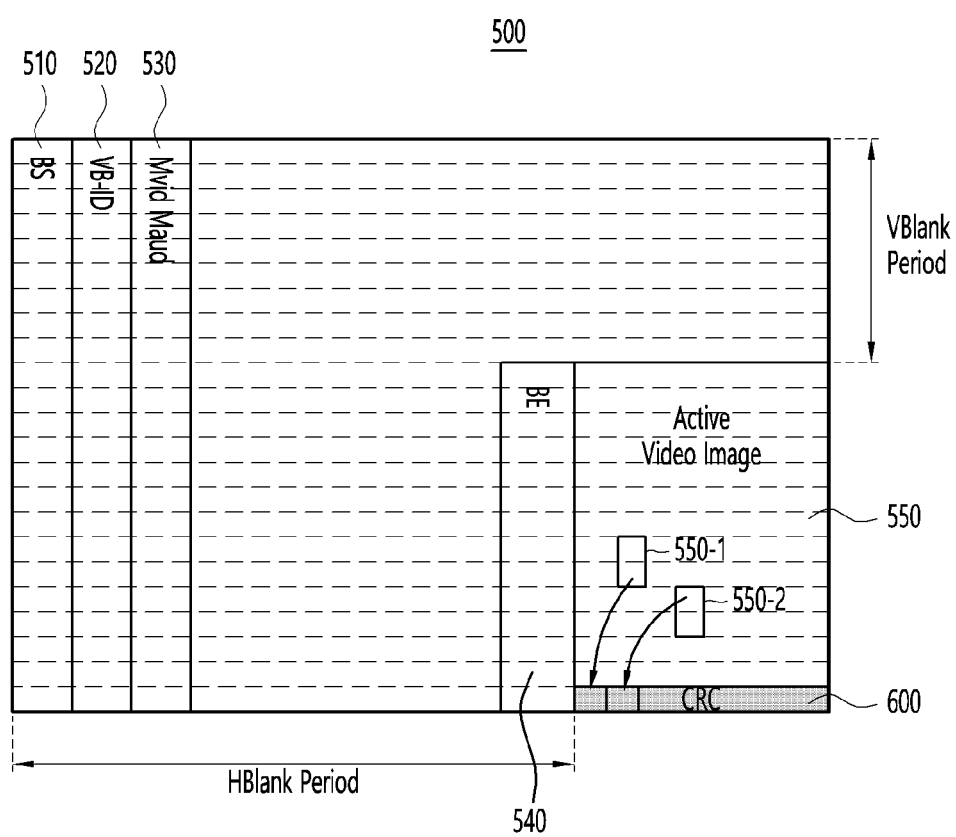
FIG. 6 is a diagram illustrating a structure of frame data according to an embodiment.

FIG. 6 is a diagram illustrating a structure of frame data according to an embodiment.

Referring to FIG. 6, according to an embodiment, a frame 500 may include a vertical blank period (VBlank Period), a horizontal blank period (HBlank Period), image data 550 (e.g., active video image data), and cyclic redundancy check (CRC) data 600. According to an embodiment, the CRC data 600 may be set to be included in the last horizontal line within the image data 550 or to be additionally configured in a next horizontal line of the last horizontal line of the image data 550. For example, a start time of the CRC data 600 within the frame 500 may be the same as a start time of each horizontal line of the image data 550 as shown in FIG. 6. For example, when the frame 500 is transmitted, horizontal lines corresponding to the vertical blank period may be transmitted first and then horizontal lines including the horizontal blank period may be transmitted. In this case, the horizontal blank period may start from the BS 510 and end at the BE 540 for each horizontal line. In each horizontal line including the horizontal blank period, after the BE 540 is transmitted, each horizontal line of the image data 550 may be sequentially transmitted. According to an embodiment, after the last horizontal line of the image data 550 is transmitted, the CRC data 600 may be transmitted after the BE 540 is transmitted in the next horizontal line. According to an embodiment, the CRC data 600 may be transmitted so as to correspond to the time of transmission of each pixel data constituting the image data 550. A detailed description thereof will be described later in a description of FIG. 8.

According to an embodiment, the CRC data 600 may include CRC data for at least one partial area among areas of the image data 550 included in the frame 500 (e.g., the entire area of the image data 550). For example, the CRC data 600 may include first CRC data 601 for a first partial area 550-1 and second CRC data 602 for a second partial area 550-2 among areas of the image data 550 included in the frame 500. Although FIG. 6 illustrates two partial areas 500-1 and 500-2 according to an embodiment, one partial area or three or more partial areas may be set. When the image data 550 is a vehicle display installed in a vehicle, the first partial area 550-1 or the second partial area 550-2 may include a map, a gear state, a turn signal lamp state, a vehicle state, and images corresponding to values obtained from various sensors of the vehicle. For example, the first partial area 550-1 or the second partial area 550-2 may include images corresponding to front/rear/side vehicle position, pedestrian position, obstacle position, and the like.

According to an embodiment, the CRC data 600 may include data generated by performing a CRC calculation for all of the partial areas. According to another embodiment, the CRC data 600 may include data generated by performing a CRC calculation for only a specific period in which image data of each partial area is divided into a plurality of periods. According to still another embodiment, the CRC data 600 may include data generated by performing a CRC calculation for only a sub-pixel of a specific color (e.g., R, G, or B) in image data of each of the partial area.

According to one embodiment, since the CRC data 600 forms a portion of the frame 500, the CRC data 600 may be transmitted together when data of the frame 500 is transmitted. For example, the CRC data 600 may be transmitted through the main link 331 of the eDP interface 330 together with the image data 550 when the data of the frame 500 is transmitted.

Figure 7:
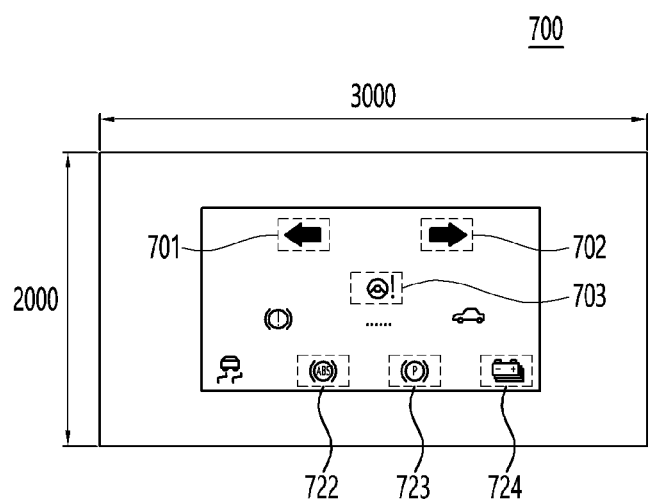
FIG. 7 is a diagram illustrating an image displayed on a vehicle display according to an embodiment.

FIG. 7 is a diagram illustrating an image displayed on a vehicle display according to an embodiment.

Referring to FIG. 7, a vehicle display 700 (e.g., an instrument panel) may consist of 3000 pixels horizontally and 2000 pixels vertically but it is set as an example to facilitate understanding and is not limited to the numerical values. According to an embodiment, image displayed on the vehicle display 700 may include a map, a gear state, a turn signal lamp state, a vehicle state, and images corresponding to values obtained from various sensors of the vehicle. According to an embodiment, at least one of the images displayed on the vehicle display 700 may be set as a partial area. For example, as shown in FIG. 7, among the images displayed on the vehicle display 700, a left turn signal lamp is set as a first partial area 701 and a right turn signal lamp is set as a second partial area 702, a power steering warning lamp is set to a third partial area 703, an ABS warning lamp is set to a 22nd partial area 722, a parking brake lamp is set to a 23rd partial area 723, and a battery warning lamp is set to a 24th partial area 724. FIG. 7 illustrates that 24 images are set as partial areas, but it is merely an example and is not limited to the number. For example, the number of settings for the partial area is not limited to a specific number. According to an embodiment, the first partial area 701 set in FIG. 7 may correspond to the first partial area 550-1 in FIG. 6 and the second partial area 702 may correspond to the second partial area 550-2 in FIG. 6.

Figure 8:
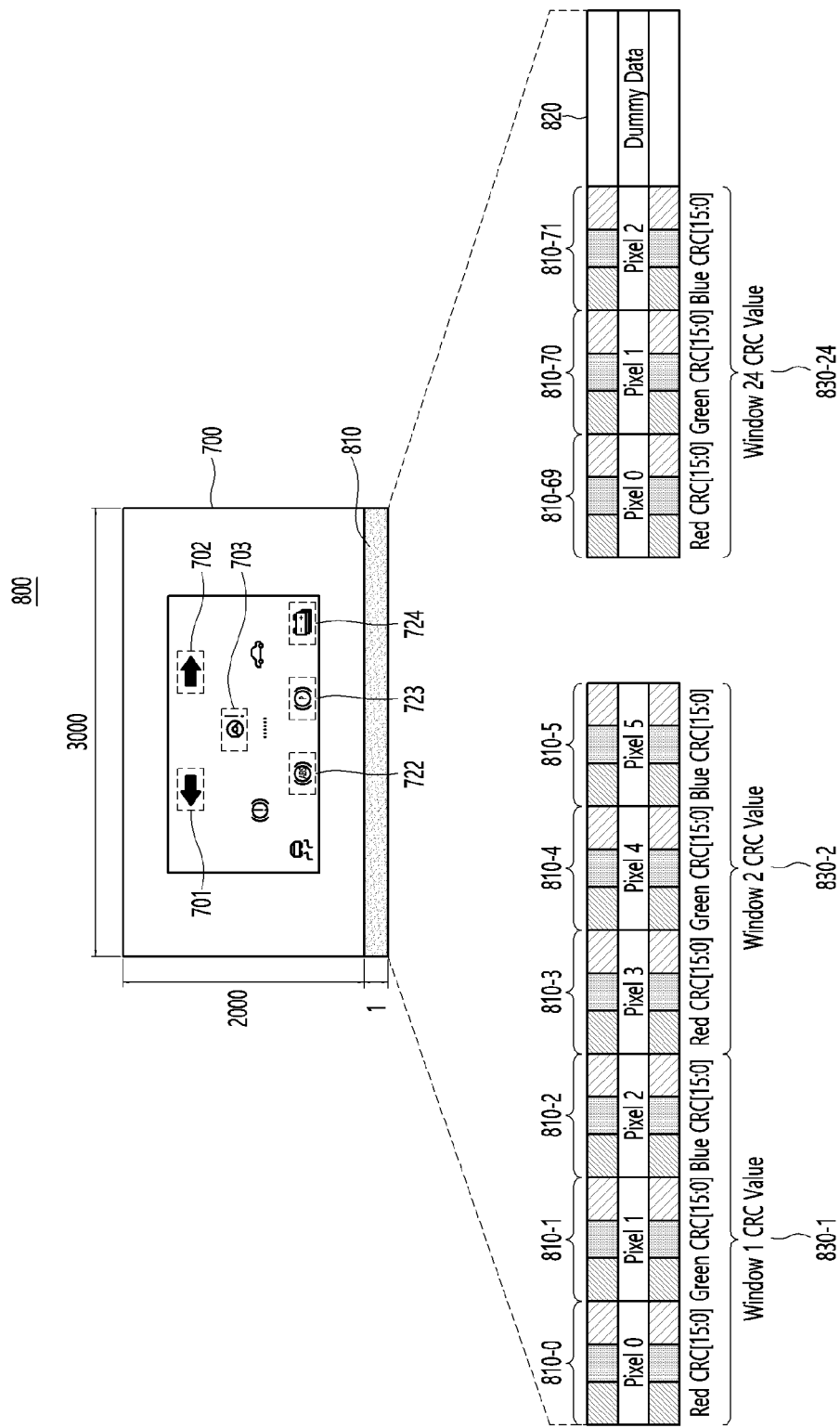
FIG. 8 is a diagram illustrating a configuration of CRC data according to an embodiment.

FIG. 8 is a diagram illustrating a configuration of CRC data according to an embodiment.

Referring to FIG. 8, a vehicle display 800 (e.g., an instrument panel) may consist of 3000 pixels horizontally and 2000 pixels vertically but it is set as an example to facilitate understanding and is not limited to the numerical values. According to an embodiment, as shown in the drawing, one horizontal line may be added in the vertical direction in the vehicle display 700 of FIG. 7. CRC data 810 may be included in the added horizontal line.

According to an embodiment, the CRC data 810 may include CRC data corresponding to each of the set partial areas. For example, when a number of partial areas is set to 24 as illustrated in FIG. 7, the CRC data 810 may include 24 CRC data. For example, the CRC data 810 may include first CRC data 830-1 corresponding to the first partial area 701, include second CRC data 830-2 corresponding to the second partial area 702, and include 24th CRC data 830-24 corresponding to the 24th partial area 724. After the last CRC data, dummy data 820 may be further included.

According to an embodiment, each CRC data corresponding to each partial area may be set to a bit size corresponding to three pixels as shown in FIG. 8. For example, assuming that each pixel includes three sub-pixels and each sub-pixel is represented by a 10-bit grayscale value, one pixel may be represented by 30 bits. In this case, when CRC data for each sub-pixel included in each partial area is set to 16 bits, 30 bits corresponding to each pixel may consist of a 14-bit most significant bit (MSB) and a 16-bit least significant bit (LSB). According to an embodiment, the 14-bit MSB may be filled with "0", and the 16-bit LSB may consist of CRC data for each sub-pixel included in each partial area.

For example, the first CRC data 830-1 corresponding to the first partial area 701 may be set in an area corresponding to a 0th pixel 810-0, a first pixel 810-1, and a second pixel 810-2. In this case, CRC data for a sub-pixel R(red) included in the first partial area 701 may be set in an area corresponding to the 0th pixel 810-0. Assuming that the 0th pixel 810-0 has a size of 30 bits, a 14-bit MSB may be filled with "0", and a 16-bit LSB may consist of CRC data for the sub-pixel R included in the first partial area 701. Assuming that the 0th pixel 810-0 has a size of 24 bits, an 8-bit MSB may be filled with "0" and the 16-bit LSB may consist of CRC data for the sub-pixel R included in the first partial area 701. Assuming that the 0th pixel 810-0 has a size of 18 bits, a 2-bit MSB may be filled with "0" and the 16-bit LSB may consist of CRC data for the sub-pixel R included in the first partial area 701.

According to an embodiment, CRC data for a sub-pixel G (green) included in the first partial area 701 may be set in an area corresponding to the first pixel 810-1. Assuming that the first pixel 810-1 has a size of 30 bits, a 14-bit MSB may be filled with "0" and a 16-bit LSB may consist of CRC data for the sub-pixel G included in the first partial area 701. Assuming that the first pixel 810-1 has a size of 24 bits, an 8-bit MSB may be filled with "0" and the 16-bit LSB may consist of CRC data for the sub-pixel G included in the first partial area 701. Assuming that the first pixel 810-1 has a size of 18 bits, a 2-bit MSB may be filled with "0" and the 16-bit LSB may consist of CRC data for the sub-pixel G included in the first partial area 701.

According to an embodiment, CRC data for a sub-pixel B (blue) included in the first partial area 701 may be set in an area corresponding to the second pixel 810-2. Assuming that the second pixel 810-2 has a size of 30 bits, a 14-bit MSB may be filled with "0" and a 16-bit LSB may consist of CRC data for the sub-pixel B included in the first partial area 701. Assuming that the second pixel 810-2 has a size of 24 bits, an 8-bit MSB may be filled with "0" and the 16-bit LSB may consist of CRC data for the sub-pixel B included in the first partial area 701. Assuming that the second pixel 810-2 has a size of 18 bits, a 2-bit MSB may be filled with "0" and the 16-bit LSB may consist of CRC data for the sub-pixel B included in the first partial area 701.

In the same way, CRC data for a sub-pixel R included in the second partial area 702 may be set in an area corresponding to a third pixel 810-3. CRC data for a sub-pixel G included in the second partial area 702 may be set in an area corresponding to a fourth pixel 810-4. CRC data for a sub-pixel B included in the second partial area 702 may be set in an area corresponding to a fifth pixel 810-5.

In the same way, CRC data for a sub-pixel R included in the 24th partial area 724 may be set in an area corresponding to a 69th pixel 810-69. CRC data for a sub-pixel G included in the 24th partial area 724 may be set in an area corresponding to a 70th pixel 810-70. CRC data for a sub-pixel B included in the 24th partial area 724 may be set in an area corresponding to a 71th pixels 810-71.

According to an embodiment, when CRC data corresponding to 24 partial areas is set in an area corresponding to 72 pixels as shown in FIG. 8, dummy data 820 may be set in an area corresponding to remaining pixels except 72 pixels out of a total of 3000 pixels.

According to an embodiment, as described above, the CRC data 810 may include CRC data for all three sub-pixels (e.g., R, G, and B) of each partial area or may include only CRC data corresponding to a specific sub-pixel. For example, the CRC data 810 may be set so as to include only the CRC data for the sub-pixel R among sub-pixels for the first partial area 701 or may be set so as to include only the CRC data for the sub-pixel G among sub-pixels for the second partial area 702.

Figure 9:
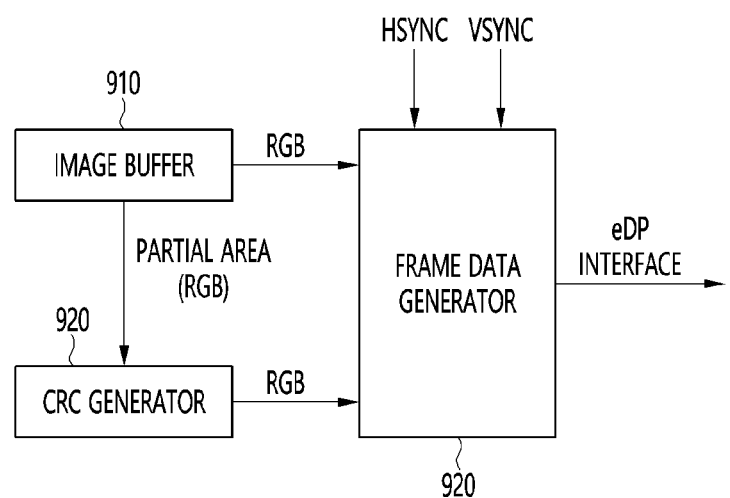
FIG. 9 is a circuit diagram of a data transmitting device according to an embodiment.

FIG. 9 is a circuit diagram of a data transmitting device according to an embodiment.

Referring to FIG. 9, the data transmitting device (e.g., the display processing device) according to an embodiment may include an image buffer 910, a CRC generator 920, and a frame data generator 930. The image buffer 910 may store image data (e.g., image data 550 of FIGS. 5 and 6).

According to an embodiment, the CRC generator 920 may generate CRC data for at least one set partial area among image data stored in the image buffer 910. The CRC data may be generated through redundancy and polynomial calculation and various known CRC calculation methods may be applied thereto. For example, the CRC calculation method may be performed through an XOR operation with original data using a number of CRC generation bits (n) and Divisor(n+1) obtained through a set polynomial.

According to an embodiment, the CRC generator 920 may generate the first CRC data 830-1 for the first partial area 701, the second CRC data 830-1 for the second partial area 702, and the 24th CRC data 830-24 for the 24th partial area 724.

According to an embodiment, the frame data generator 930 may generate frame data by adding CRC data generated by the CRC generator 920 to image data stored in the image buffer 910. For example, the frame data generator 930 may generate frame data corresponding to the frame 500 shown in FIG. 6 on the basis of a horizontal synchronization signal HSYNC and a vertical synchronization signal VSYNC. The frame data generated by the frame data generator 930 may be transmitted through the eDP interface (e.g., a main link transmission line). According to an embodiment, as described above in FIG. 6, the frame data constitutes CRC data 600 on a next horizontal line of the image data 550, so that the CRC data 600 may be transmitted at the same time as the time of transmission of the image data 550.

Figure 10:
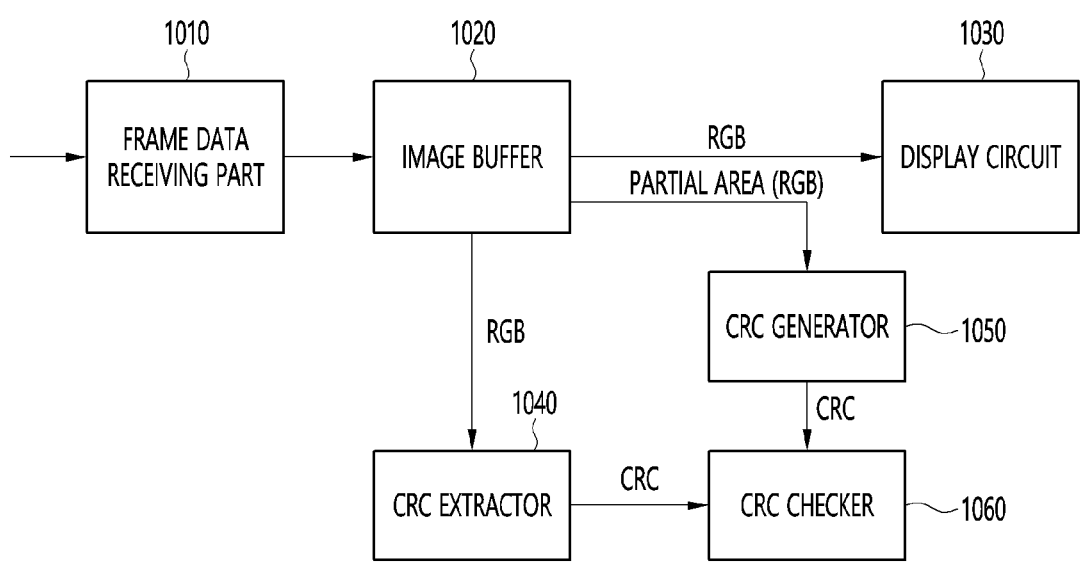
FIG. 10 is a circuit diagram of a data receiving device according to an embodiment.

FIG. 10 is a circuit diagram of a data receiving device according to an embodiment.

Referring to FIG. 10, the data receiving device (e.g., a display driving device) according to an embodiment may include a frame data receiving part 1010, an image buffer 1020, a display circuit 1030, a CRC extractor 1040, a CRC generator 1050, and a CRC checker 1060.

According to an embodiment, the frame data receiving part 1010 may receive frame data transmitted through the eDP interface in FIG. 9. The image buffer 1020 may extract and store image data 550 and CRC data 600 from frame data constituting the frame 500. For example, since the CRC data 600 is transmitted at the same time as the time of transmission of the image data 550, the CRC data 600 may be stored in the image buffer 1020 together with the image data 550. The image data 550 stored in the image buffer 1020 may be transmitted to the display circuit 1030. The display circuit 1030 may convert digital image data 550 into an analog signal and then provide the analog signal to each pixel (e.g., sub-pixel).

According to an embodiment, the CRC extractor 1040 may extract CRC data 600 from data stored in the image buffer 1020. For example, the CRC extractor 1040 may identify data disposed on a next horizontal line of the last horizontal line of the image data 550 stored in the image buffer 1020 as the CRC data 600. In addition, the CRC extractor 1040 may identify data excluding dummy data from data disposed on the horizontal line following the last horizontal line of the image data 550 as the CRC data.

According to an embodiment, the CRC generator 1050 may generate CRC data from data corresponding to each partial area among image data stored in the image buffer 1020. The CRC checker 1060 may compare the CRC data corresponding to each partial area identified by the CRC extractor 1040 with the CRC data corresponding to each partial area generated by the CRC generator 1050 to determine an error in the corresponding partial area. According to an embodiment, when it is determined that an error has occurred in a specific partial area as a result of the determination of the CRC checker 1060, it is possible to request retransmission of image data to the display processing device or to notify a user whether there is an error.

Figure 11:
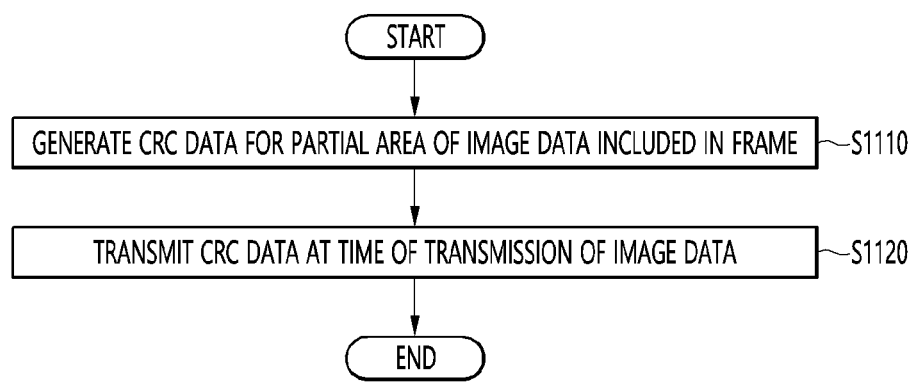
FIG. 11 is a flowchart of a data transmission method according to an embodiment.

FIG. 11 is a flowchart of a data transmission method according to an embodiment.

Referring to FIG. 11, according to an embodiment, the data processing device may generate CRC data for each partial area among areas of image data included in the first frame (S1110).

According to an embodiment, the data processing device may transmit CRC data generated for each partial area at the time of transmission of the image data (S1120). In this case, the CRC data may be transmitted at the time of transmission of each pixel data constituting the image data.

Figure 12:
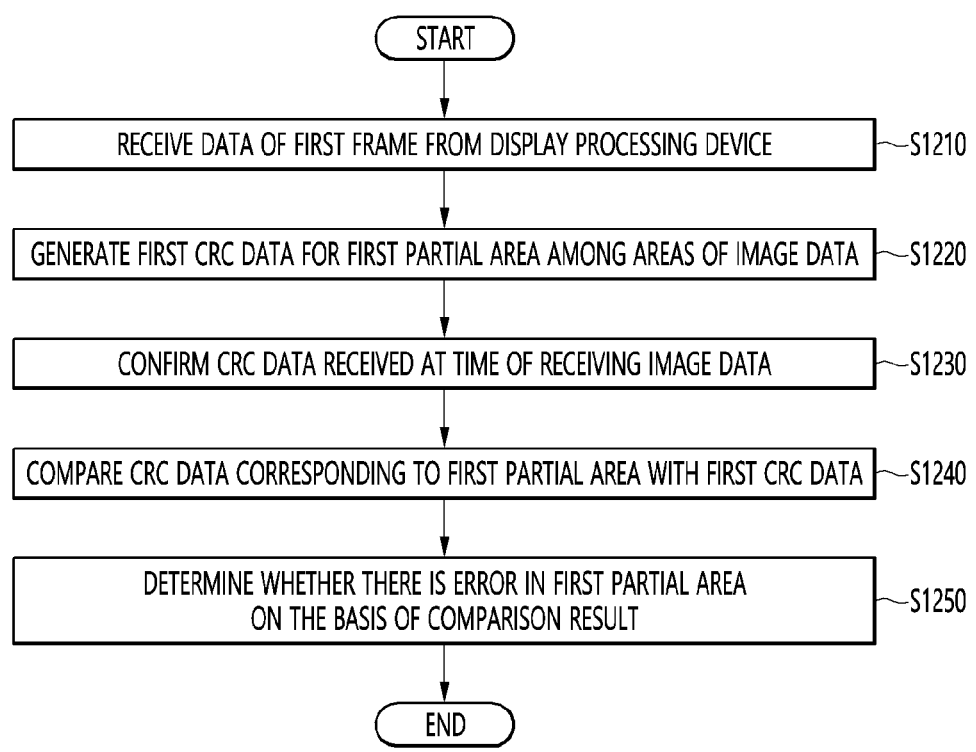
FIG. 12 is a circuit diagram of a method for inspecting image data according to an embodiment.

FIG. 12 is a circuit diagram of a method for inspecting image data according to an embodiment.

Referring to FIG. 12, according to an embodiment, the data driving device may receive data of the first frame from the display processing device (S1210).

According to an embodiment, the data driving device may generate the first CRC data for the first partial area among areas of the image data included in the first frame (S1220).

According to an embodiment, the data driving device may confirm CRC data received at the time of receiving the image data in the received data of the first frame (S1230).

According to an embodiment, the data driving device may compare the CRC data corresponding to the first partial area among the received CRC data with the generated first CRC data (S1240). According to an embodiment, the data driving device may determine whether there is an error in the first partial area on the basis of the comparison result (S1250).

According to various embodiments, as described above, according to the present embodiment, it is possible to inspect an error in data of an important area among information displayed on a display (e.g., a vehicle display). In addition, according to the present embodiment, it is possible to inspect an error in data in an important area without adding a separate interface for transmitting data.

What is claimed is:

1. A method for inspecting image data of a display device including a data processing device and a data driving device, the method comprising:

generating, by the data processing device, first cyclic redundancy check (CRC) data for partial areas among areas of image data of a first frame and transmitting the image data of the first frame and the first CRC data to the data driving device;

receiving, by the data driving device, the image data of the first frame and the first CRC data and generating second CRC data for the partial areas among areas of the image data of the first frame on the basis of the image data of the first frame; and comparing, by the data driving device, the first CRC data with the second CRC data to determine whether there is an error in the partial areas among areas of the image data of the first frame, wherein the first frame includes the image data and first horizontal line data associated with a horizontal line, the first horizontal line data includes the first CRC data, the first horizontal line data comprises a first portion and a second portion, the first portion includes CRC data, the second portion includes dummy data, CRC data for all sub-pixels included in one area of the partial areas is sequentially included in the first horizontal line data, and CRC data for all sub-pixels included in another area of the partial areas is sequentially included in the first horizontal line data.

2. The method of claim 1, wherein the transmitting of the first CRC data includes transmitting the first CRC data to the data driving device when the image data of the first frame is transmitted.

3. The method of claim 1, wherein the transmitting of the first CRC data includes transmitting the first CRC data when each pixel data constituting the image data is transmitted.

4. The method of claim 1, wherein the first frame includes a vertical blank period, a horizontal blank period, and a period for the image data.

5. The method of claim 4, wherein the transmitting of the first CRC data includes transmitting the first CRC data at the time of transmission of the image data after the horizontal blank period is terminated.

6. The method of claim 1, wherein the first CRC data is transmitted through the same transmission line as the image data.

7. The method of claim 1, wherein the first CRC data is transmitted through a main link transmission line.

8. The method of claim 1, wherein the partial areas among areas of the image data included in the first frame comprises an image corresponding to a vehicle state.

9. The method of claim 1, wherein the transmitting of the first CRC data includes generating first CRC data for each of a plurality of partial areas among areas of the image data included in the first frame and transmitting sequentially the first CRC data for each of the plurality of partial areas for each partial area at the time of transmission of the image data.

10. The method of claim 1, wherein the generating of the first CRC data comprises dividing data corresponding to the partial areas into a plurality of periods and generating first CRC data for data corresponding to a specific period among the plurality of periods.

11. The method of claim 1, wherein the generating of the first CRC data comprises generating first CRC data for data corresponding to a sub-pixel of a specific color among data corresponding to the partial areas.

12. A display device for inspecting image data comprising:
a data processing device configured to generate first cyclic redundancy check (CRC) data for partial areas among areas of image data included in a first frame to transmit the image data of the first frame and the first CRC data; and
a data driving device configured to receive the image data of the first frame and the first CRC data from the data processing device to generate second CRC data for the partial areas among areas of the image data included in the first frame on the basis of the image data of the first frame and to compare the first CRC data with the second CRC data to determine whether there is an error in the partial areas among areas of the image data included in the first frame, wherein
the first frame includes the image data and first horizontal line data associated with a horizontal line,
the first horizontal line data includes the first CRC data,
the first horizontal line data comprises a first portion and a second portion,
the first portion includes CRC data,
the second portion includes dummy data,
CRC data for all sub-pixels included in one area of the partial areas is sequentially included in the first horizontal line data, and
CRC data for all sub-pixels included in another area of the partial areas is sequentially included in the first horizontal line data.

13. The display device of claim 12, wherein the data processing device comprises:
a first CRC generator configured to generate the first CRC data for the partial areas among areas of the image data included in the first frame; and
a frame data generator configured to generate data of the first frame so that the first CRC data is transmitted at the time of transmission of the image data.

14. The display device of claim 13, wherein
the first CRC generator generates first CRC data for each of a plurality of partial areas among areas of the image data included in the first frame, and
the frame data generator generates the data of the first frame so that the first CRC data for each of the plurality of partial areas is sequentially transmitted for each partial area at the time of transmission of the image data.

15. The display device of claim 12, wherein the data driving device comprises:
a frame data receiving part configured to receive the data of the first frame transmitted from the data processing device;
a second CRC generator configured to generate the second CRC data for the partial areas among areas of the image data included in the first frame;
a CRC extractor configured to confirm the first CRC data received at the time of receiving image data from the data of the first frame; and
a CRC checker configured to compare the first CRC data corresponding to the partial areas among the first CRC data confirmed by the CRC extractor with the second CRC data generated by the second CRC generator to determine whether there is an error in the partial areas.

* * * * *